United States Patent Office 3,361,568
Patented Jan. 2, 1968

3,361,568
COMPOUND COATINGS
David P. Kidger, Glen Rock, N.J., assignor to National Biscuit Company, a corporation of New Jersey
No Drawing. Filed June 28, 1967, Ser. No. 649,473
11 Claims. (Cl. 99—23)

ABSTRACT OF THE DISCLOSURE

Improved hard butters are prepared by interesterification of a material which consists of between 10 and 40% of an essentially completely hydrogenated oil or fat which may be cottonseed, lard, peanut, tallow, soybean, sesame, sunflower, rapeseed, ravison, mustard seed, herring, sardine, menhaden or whale oil, and between 60 and 90% of an oil which is partially hydrogenated palm kernel or coconut oil. When rapeseed or marine oils are used, as the component which is essentially completely hydrogenated, the resulting hard butters are compatible with chocolate liquor up to 45% of the latter in chocolate coating compositions, and they confer unusual gloss to the finished coatings.

---

This application is a continuation-in-part of Serial No. 517,149, filed Dec. 5, 1965, now abandoned, which was a continuation of Ser. No. 256,292, filed Feb. 5, 1963, and Ser. No. 421,650, filed Dec. 28, 1964, the latter two applications having now been abandoned.

This invention relates to hard butter compound coatings. Hard butter coatings is the name used for edible products which exhibit good hardness at room temperature and melting characteristics suitable for handling and storage, and which are capable of retaining a pleasant appearance and good eating qualities during summer months.

Hard butters are triglycerides used in the manufacture of icings and the like, in the confectionery industry. They have the ability of taking bright colors, for instance yellow, pink and white. Hard butters, in combination with cocoa, sugar and an emulsifier, are also extensively used in chocolate-type coatings, that is, in the manufacture of chocolate coating material for candies, ice cream bars, biscuits, cakes, cookies, chocolate bars, and icings.

Hard butter chocolate-type coatings are similar to pure chocolate coatings, because they both contain a suspension of finely ground solids. In pure chocolate coatings, the solids are suspended in cocoa butter, while, in hard butter coatings, the solids are suspended in hard butters. The solids are a sweetening agent, for instance, sucrose, dextrose, saccharin compositions or a mixture of sweetening agents, malt powder, dry milk solids, buttermilk powder, salt, coloring agents and flavoring agents. An emulsifier is frequently added, for instance, lecithin. Cocoa is used to impart the chocolate flavor.

Fats used in coating compositions must satisfy several requirements. They must be free of the waxy taste in the mouth, which is the result of hydrogenation widely practiced in this art, for the purpose of raising the melting range and obtaining products which are solid at room temperature. Where hydrogenation is complete or essentially complete, the products frequently are too hard, similar to waxes, do not melt sharply and give a "waxy" feeling in the mouth, a feature which substantially diminishes their value in the food industry. Several studies have been made to remove the waxy taste. It has been found that, where the melting range is between 96° F. and 120° F., preferably between 96° and 114° F., a satisfactory fat is obtained, essentially free from the waxy taste. The hard butters which completely melt in this range, exhibit the property called in the art a quick "get-a-way" and a pleasing "mouth feel." Thus this desirable property, which accounts for the freedom from the waxy taste, is mainly associated with the melting range of the fats.

Another requirement of fats used in coating compositions, is referred to as "fracture" or "brittle" quality, or "snap," that is, they should remain essentially solid up to the temperature of 98.6° F., and should completely melt, in a very short period of time. This requirement is usually difficult to meet, because fats, in sharp contrast with other solids, are not definite single substances, but are mixtures of different triglycerides, so that the melting point of a fat cannot be defined as it would be for a crystalline homogeneous substance, and it may have different meanings according to the method used for the determination.

Another requirement of the fats for use as hard butter compound coatings is the reproducibility of results, because they may vary in composition from year to year, and from one location to another. Further, it is necessary to predict closely and to control the melting range of the end products, because the confectionery industry requires a different melting range for the hard butters, depending upon each individual confectionery product and according to the season. Bakery goods with chewy resistance, for instance crunchy nut rolls, need a higher-melting hard butter, but tender confections, for instance marshmallows, require a lower-melting fat. Essentially, the hard butters used should be capable of standing firm at temperatures encountered in summer weather, without letting some of the components bleed out, or as it is usually referred to, "sweat." Similarly, the finished coating composition should "stand up," that is the coating should resist appreciable temperature changes, should not soften or stick to the center or other food product, so as to stain it, and should not stick to the package.

In the preparation of chocolate coating compositions, a serious disadvantage of all hard butters known in the art, is that they are not compatible with chocolate liquor, and incorporation of chocolate liquor together with the hard butters into coating compositions, changes the softening and melting characteristics of the hard butters. When chocolate liquor is incorporated into coating compositions, even to a small extent, for instance 4–5%, together with the conventional hard butters, separation and fat blooming occur on standing. Occasionally, the coating compositions containing chocolate liquor and conventional hard butters appear to be satisfactory for a few hours or days, but fat bloom becomes evident on more prolonged storage. In view of the incompatibility between hard butters and chocolate liquor, the manufacturer, in order to produce coatings which are stable to storage for at least two weeks, either totally eliminates chocolate liquor and replaces it with cocoa or keeps the chocolate liquor content in the coating compositions to a very low, practically nominal value.

The disadvantage inherent in the use of cocoa, essentially as the only chocolate ingredient, are manifest from a comparison of the compositions of cocoa and chocolate liquor. Cocoa, which is manufactured from chocolate liquor, by extraction of a substantial amount of the cocoa butter present, contains between 5 and 30% of cocoa butter. Chocolate liquor, on the other hand, contains 50% of cocoa butter. Manifestly, the use of cocoa rather than chocolate liquor gives products with lower cocoa butter content and less rich flavor.

It is manifest from the foregoing that, if a hard butter, compatible with chocolate liquor, could be manufactured, the resulting coating compositions would offer equally rich flavor as the compositions prepared from natural chocolate.

The need in the art for a satisfactory hard butter compatible with chocolate liquor, and capable of being substituted for cocoa butter, is so pressing that many attempts have been made to synthesize hard butters compatible with chocolate liquor. Some synthetic hard butters are claimed to be compatible with chocolate liquor, but careful study of these synthetic products, demonstrates that they do not offer the solution to the problem. For instance, Feuge, Lovegren and Cosler in "Cocoa Butter-Like Fats From Domestic Oils," Journal of the American Oil Chemists' Society, vol. 35, p. 194 (1958), have reported the results of their studies on the synthesis of cocoa butter substitutes by the esterification of mixtures of oleic, palmitic and stearic acids, or by the interesterification of the corresponding glycerides, followed by the fractional crystallization of the reaction products. Satisfactory results are reported with a fraction obtained from the interesterification of 70 parts of completely hydrogenated cottonseed oil and 30 parts of olive oil, followed by fractional crystallization. According to the same publication the product thus obtained is incorporated into chocolate bar compositions, in the proportion of 21.9%, together with 17.9% of chocolate liquor. The chocolate bars are reported to be stable when they are heated to 100° F. and then cooled back to room temperature.

In spite of the successful results reported, the hard butters prepared as described in the above-cited publication, are not suitable for large-scale commercial application, and the coatings containing the hard butters and chocolate liquor, to the extent of 17.9% of the latter, are not stable on storage, and after standing at room temperature for merely two weeks, fat bloom occurs.

As late as May 1964, in "Marketing Potentials for Modified Edible Fats and Oils." Marketing Research Reports No. 659. U.S. Department of Agriculture. Economic Research Service. Marketing Economics Division, p. 17 (May 1964), the shortcomings of cocoa butter substitutes are discussed, namely incompatibility with chocolate liquor, improper gloss, rancidity, and no ready solution for the problem is foreseen.

The foregoing summary demonstrates that, in spite of considerable research, no substantial progress has been made towards the manufacture of hard butters which are compatible with chocolate liquor, with a melting range which is reproducible and which may be controlled, according to the season and the particular type of goods being manufactured.

An object of this instant invention is to prepare hard butters which are compatible with chocolate liquor, so that chocolate coating compositions may be prepared containing chocolate liquor in amount up to 45% of the finished coating composition, with a high degree of gloss and palatability.

Another object is to prepare hard butters which melt in the range between 96° to 115° F., which are free of the "waxy" taste, which remain solid at room temperature but melt sharply at body temperature, and with a melting range which may be controlled within narrow limits.

Still another object is to utilize commercially available low-cost materials, including marine oils, namely herring oil, menhaden oil, sardine oil, whale oil, and mixtures of the several raw materials.

The foregoing and other objects will be understood more fully from the following description of specific examples taken in conjunction with the tables, and figures of drawings.

One of the starting materials in practicing the invention, which is called hereinafter Component A, is a high-molecular weight fully hydrogenated fat or oil. Vegetable oils may be used such as soybean oil, cottonseed oil, sesame oil, sunflower oil, safflower oil, peanut oil, palm oil, corn oil, and oils of the Cruciferae family, such as rapeseed oil, ravison and mustardseed oil. Animal fats, such as lard and tallow, as well as marine oils, for instance herring oil, menhaden oil, sardine oil, whale oil, and their mixtures may also be used. The unpleasant odors present in marine oils, due to low boiling components, may be easily and completely removed by distillation and do not interfere with the finished products. Fats and oils from the different animal, vegetable and marine sources, may also be combined according to different proportions.

Oleic acid is present in all the fats used to prepare Component A. It is present in amount varying between 41 and 51% in lard, 39 to 50% in beef tallow, and 36 to 47% in mutton tallow. It is also present in considerable amount in the marine oils, and in the vegetable oils used in accordance with this invention. Essentially the amount of oleic acid varies between a lower limit of about 8% in herring oil, 12% in rapeseed oil, 15% in safflower and 17% in soybean, to a maximum of 71% in peanut oil.

Palmitic acid, that is, the $C_{16}$ saturated acid, is present in amount of 47% in palm oil, 12% in herring oil, and is as low as 3% in sunflower and safflower oil and 2.7% in rapeseed oil. By varying the proportions of the fats, it is possible to have the desired proportion of palmitic acid, up to 47% of the total of Component A. Another essential characteristic of this invention is that all the fats, utilized individually or in mixtures, to prepare Component A, are free from lauric acid.

In accordance with this invention, one of the fats or oils listed above, or a mixture of them is hydrogenated, in the presence of a catalyst, for instance reduced nickel on kieselguhr, preferably under conditions of 2 to 45 pounds of hydrogen pressure and temperature of 100° to 225° C. Hydrogenation is allowed to proceed until the desired refractive index and iodine value are obtained, corresponding to essentially complete hydrogenation. The iodine value of the hydrogenated fat or oil should not be above 5 and is preferably lower than 5. In the case of herring oil, which has high iodine value, 125–145 after hydrogenation, the iodine value, about 5, corresponds to essentially complete hydrogenation. This Component A which confers hardness and high-melting characteristics to the resulting product, is called "all-hydrogenated," it being understood that some unsaturation, to a very small extent, may still be present.

The second component used in practicing the invention, called component B, is a lauric acid-containing vegetable oil. Typical instances of oils containing lauric acid are palm kernel oil, coconut oil, and babassu oil, which contains between 44 and 56% of lauric acid. In accordance with the invention, coconut oil, palm kernel oil or babassu oil is subjected to partial reduction under carefully controlled conditions, to provide products, which, after combination with component A and further processing are free from the "waxy feel". The extent of hydrogenation should correspond to about one-half of the unsaturation originally present. For instance, the hydrogenation of coconut oil, which has iodine value of 10, is allowed to proceed until the iodine value of the product is about 5, corresponding to a refractive index of 25 at 60° C. Palm kernel oil is hydrogenated until the iodine value is 12, corresponding to a refractive index of 25.8 at 60° C. The product from the incomplete hydrogenation of palm kernel and coconut oil is called component B, it being understood that a preselected mixture in varying proportions of the incompletely hydrogenated palm kernel, coconut and babassu oil, may also be used.

For the hydrogenation of palm kernel, coconut oil and babassu oil, good results are obtained with reduced nickel on kieselguhr, at a temperature of 150°–225° C. and hydrogen pressure between 2 and 45 pounds. This hydrogenation step is usually complete for a 2-kg. batch of coconut oil after one and one-half minutes, but it requires 20 minutes for palm kernel oil.

The crux of this invention resides in the finding that very satisfactory hard butters, having melting characteristics which may be controlled within a narrow range, are obtained, if the two components A and B, prepared as described above, are blended in preselected proportions and then subjected to interesterification. Although the relative proportion of component A, that is the oil or fat which is substantially completely hydrogenated, and the partially-hydrogenated oil, component B, may vary widely, in general, the proportion should be between 10 and 40% for component A and between 90 and 60% for component B.

According to a specific embodiment of the invention, when component A is a material rich in high molecular fatty acids, including high molecular weight unsaturated fatty acids, the resulting hard butters, after incorporation into coating compositions, with conventional coating ingredients, impart unusual shine and gloss to the compositions. Moreover, the hard butters prepared from these raw materials are compatible with chocolate liquor so that chocolate liquor may be incorporated into coating compositions to substitute in part and even to eliminate totally the use of cocoa. Marine oils and vegetable oils of the Cruciferae family, for instance rapeseed oil, ravison and mustardseed are excellent for this purpose, because they are rich in high molecular weight unsaturated fatty acids. For instance, herring oil contains about 24% of fatty acids containing 22 carbon atoms and one double bond, that is, docosenoic acid, and about 25% of fatty acid containing 20 carbon atoms, that is, eicosenoic acid. The proportion of $C_{20}$ unsaturated fatty acids is high in all marine oils, because it is 18–26% in sardine oil, depending on the origin, whether it is the California sardine oil or Japanese sardine oil, 19% in menhaden oil, and 12% in whale oil. The fraction of the unsaturated acids containing 22 carbon atoms, is high also in the other marine oils, because it is 14–19% in sardine oil, 11.7% in menhaden and 7% in whale oil. Rapeseed oil is also advantageously used, because the content of fatty acids with 20 carbon atoms, containing one double bond is 16.5%, and the content of fatty acids containing 22 carbon atoms and one double bond, is 54–55%.

Although the scope of this instant invention is not limited by any speculative explanation, it seems reasonable to assume that the superior gloss and the high degree of compatibility with chocolate liquor of the hard butters prepared from marine oils and vegetable oils of the Cruciferae family, for instance rapeseed oil, are the result of the high proportion of high-molecular-weight unsaturated fatty acids.

The advantage of the compositions and the process in accordance with this invention, may be readily appreciated, if one considers that with the conventional hard butters, the amount of chocolate liquor which can be incorporated into coating compositions, is very small, usually 4–5% of the total, and the use of mixtures of chocolate liquor and cocoa containing a substantial amount of cocoa is necessary. On the other hand, in accordance with this invention, the amount of cocoa may be substantially decreased and even totally eliminated. Thus, this invention represents a revolutionary advance in the confectionery industry, because of the manifest superiority of chocolate liquor over cocoa, as the chocolate-ingredient. As compared with the flavor of cocoa-containing coating compositions, the compositions prepared in accordance with the process described hereinbelow, exhibit palatability and flavor, superior to coating compositions prepared from conventional hard butters and cocoa. Moreover, because of the high cocoa butter content of chocolate liquor, in the range of 50%, it is possible to decrease the proportion of the hard butter in the coating compositions, and still retain the softness of the coating.

It has been found that inverting the products, that is using as component A, an oil which does not contain a substantial amount of unsaturated components and which, on the other hand, contains a substantial amount of lauric acid, for instance babassu oil, together with, for instance, lard, as component B, which contains a substantial amount of oleic acid, is not satisfactory. It is probable that the greater amount of oleic acid and other unsaturates still present under these conditions, due to the incomplete hydrogenation of lard, if it is used to prepare component B, is responsible for the poor results.

In accordance with this invention, the mixture of components A and B is subjected to interesterification. The interesterification reaction is also called in the art "rearrangement."

The mixtures of components A and B before interesterification still exhibit the beta structure, but the products after interesterification in accordance with this invention, exhibit the beta prime structure. The terms beta and beta prime mean the two crystalline polymorphic forms which are characterized by differences in X-ray diffraction patterns, as discussed, for instance, in Gilman "Advanced Treatise of Organic Chemistry," vol. III (1953), Chapter on Lipids, p. 190.

The preferred catalysts for the interesterification are basic anhydrous substances, such as sodium, potassium, alkali metal alkoxides having up to 4 carbon atoms, alkali metal hydrides as sodium hydride, and alkali earth metal hydrides for instance, calcium hydride. Aluminum alkoxides and lithium aluminum hydride may also be used. The catalysts are effective at temperature below 150° C., where the components A and B are present in a single liquid phase. The amount of catalyst should be kept at a minimum, and in order to avoid saponification of the glycerides, should not be in excess of 1%, preferably 0.2% by weight. Since the catalyst is easily destroyed by moisture, carbon dioxide and air, it is advantageous to dry the mixture thoroughly before the interesterification reaction. Heating under vacuo to remove moisture is satisfactory. The reaction is conveniently carried out in an atmosphere of nitrogen at a temperature of about 140° C. The effectiveness of the catalyst and the completeness of the reaction may be easily followed by the color change, the mixture darkening and acquiring a reddish color. The rearrangement usually occurs very rapidly but in order to ensure complete rearrangement, heating is continued for about one-half hour. The mass then is cooled to about 90° C. and the excess catalyst is destroyed with water or dilute acid.

The physical properties of the blend are different from those of the unrearranged mixture of components A and B. Some of the physical properties which are altered by catalytic rearrangement are melting characteristics, melting range, congeal point, plasticity, crystallization characteristics and eating characteristics. It is very likely that the improvement in the properties which characterize a good hard butter is related to the conversion of the beta to the beta prime structure, after interesterification, as mentioned above. The improvement in melting characteristics and other physical properties are also due to the greater homogeneity of the final products. Interesterification essentially converts the mixtures of the two components A and B into a new product, which, although still a mixture of triglycerides, is the result of a chemical reaction, namely an exchange of acyl radicals between components A and B, and the achievement of "random" distribution, as defined in Gilman, "Advanced Treatise of Organic Chemistry," vol. III (1953), pp. 186–190.

It has been found advantageous to determine the Solid Fat Index after rearrangement for different percentage compositions of component A and B against the temperature in Fahrenheit. The determination is made from the specific volumes at various temperatures, according to the method CD–10–61, described in Official and Tentative Methods of the American Oil Chemists Society (1961). The different values obtained for several compositions 10 to 40% of component A and 90 to 60% of B with increase in temperature, are shown in the tables. In addition, for several of the compositions prepared according to this invention, the Solid Fat Index is plotted on the ordinate with the temperature on the abscissa. It may readily be seen that the hard butters prepared in accordance with this invention, exhibit curves which are quite flat in the lower temperature range up to 70° F., and which retain a sufficiently high Solid Fat Index at room temperature, for compositions of A at least 10% and B not over 90%. Then the curves become less flat in the region between 70 and 80° F., and still less flat above 80° F., indicating that melting occurs rapidly in this region. The decrease in Solid Fat Index in the region between 80° and 104° F., is between 0.6 and 2.07 per degree of temperature rise.

Examination of the plots (figures 1 through 4) also shows that the results obtained according to this invention, with the less expensive animal fats, namely lard and tallow, are practically as good as with the vegetable oils, in the range 10 to 40% of component A to 90 to 60% of B. The results below also show very satisfactory results with marine oils.

As it has been mentioned above, it is possible to select the proper constituents of component A and B as well as the respective proportions of A and B for each desired hard butter. This may be accomplished simply by application of the data in the tables, the respective plots and in some cases interpolation.

For the purpose of better illustrating the invention, the following examples are described in detail.

EXAMPLE 1

Two kilograms of lard were fully hydrogenated using 0.2% reduced nickel on kieselguhr at 30 p.s.i. of hydrogen and at a temperature of 200° C. The resulting fully hydrogenated lard was subjected to flaking. The refractive index was 31.3, corresponding to an iodine value of 3. Two kg. of coconut oil were hydrogenated under the same experimental conditions, but the reaction was interrupted when the refractive index of a sample, measured at 60° C., was 25. This corresponded to iodine value of 5. Seven hundred grams of the incompletely hydrogenated coconut oil were mixed with 300 grams of the flaked lard, prepared as described above, and heated about one-half hour above 100° C. in an atmosphere of nitrogen to remove moisture. This corresponded to 30% of component A and 70% of component B. Then a catalytic amount of sodium methoxide, about 0.2%, was added. The mixture was kept at a temperature of 120° C. Interesterification rapidly took place as evidenced by the development of a red color. The content of the flask was cooled to 90° C., and water in amount about 25% in excess over the amount of catalyst added, was used to destroy the catalyst. Solid by-products, "foots," that is soaps formed by hydrolysis of the fats, were separated from the oil by filtration. The resulting product was deodorized by high vacuo steam distillation. The product gave a very satisfactory hard butter, because it was stable and bleeding out of individual compounds at a temperature of 80° F., did not occur. The gloss was good with no change on storage.

Several compositions were prepared in ratios of lard flakes to partially hydrogenated coconut varying between 10 and 40%. The products were very satisfactory hard butters in every respect, taste, color, viscosity, set point. The table below gives the values of the solid Fat Index at different temperatures.

TABLE 1.—SOLID FAT INDEX OF LARD FLAKES WITH PARTIALLY HYDROGENATED COCONUT OIL

| T° F. | Percent Composition of Lard Flakes | | | |
|---|---|---|---|---|
| | 10 | 20 | 30 | 40 |
| 50 | 51.4 | 54.8 | 61.0 | 64.4 |
| 70 | 31.1 | 37.9 | 48.5 | 54.9 |
| 80 | 14.8 | 26.4 | 39.3 | 47.4 |
| 92 | 0.2 | 5.4 | 16.6 | 26.5 |
| 100 | 0.0 | 0.2 | 3.0 | 11.7 |
| 104 | 0.0 | 0.0 | 0.0 | 5.7 |

Figure 1 where the Solid Fat Index is plotted as the ordinate and the temperature as the abscissa, shows the variations in the region between 50° and 140° F. The composition 10% of A to 90% of B in the region between 50° and 70° F., shows a decrease in Solid Fat Index of about 1, per degree of temperature rise. In the same range the composition 40 to 60% shows a decrease of 0.47 per degree, indicating that when the hydrogenated lard is kept at the lowest proportion, the composition undergoes a more gradual softening, while the 40 to 60% composition shows a superior "stand up" quality in this region. In the region between 92° and 100° F., the composition 40 to 60% shows a decrease of 1.8 units per degree, while, with the composition in which hydrogenated lard is kept at the lowest value, the material has practically already totally melted.

The X-ray diffractometer was used for the study of the composition of the product before and after interesterification. The beta structure was prevalent before interesterification as shown by the short spacings of 3.68 (medium), 3.86 (medium), 4.59 (strong) and 5.3 (weak), in agreement with the data reported for the beta form, for instance in Mahlenbacher "The Analysis of Fats and Oils," the Garrard Press, (1960), p. 410. After interesterification, the short spacings were 4.18 (strong) and 3.78 (medium), as reported for the beta prime by the same author.

EXAMPLE 2

Flaked tallow was prepared from tallow by hydrogenation until the iodine number was 3. Palm kernel oil was hydrogenated in the same manner as coconut oil but hydrogenation was stopped when the refractive index was 25.5 to 25.7 at 60° C. Four hundred grams of flaked tallow and 600 grams of incompletely hydrogenated palm kernel oil were subjected to interesterification as in Example 1 and then deodorized. The product was satisfactory as a hard butter in chocolate type coatings, in taste, appearance, freedom from odor. The Solid Fat Index for the 40 to 60 percent composition is given in Table 2 below, as well as for other compositions in which tallow is the range of 10 to 40% of the total.

TABLE 2.—SOLID FAT INDEX OF COMPOSITIONS OF HYDROGENATED TALLOW WITH PARTIALLY HYDROGENATED PALM KERNEL OIL

| T.°, F. | Percent Composition of hydrogenated Tallow | | | |
|---|---|---|---|---|
| | 10 | 20 | 30 | 40 |
| 50 | 61.7 | 62.5 | 70.3 | 68.9 |
| 70 | 46.3 | 51.4 | 62.8 | 63.4 |
| 80 | 33.7 | 41.9 | 55.4 | 57.4 |
| 92 | 6.3 | 14.5 | 27.8 | 35.1 |
| 100 | 0.0 | 0.3 | 12.2 | 15.4 |
| 104 | 0.0 | 0.3 | 3.0 | 7.6 |

Figure 2 strikingly shows the rate of decrease of the Solid Fat Index in the region between 50° and 104° F. for the compositions of the invention. In the region up to 70° F. the decrease is about 0.77 per each degree of temperature rise, for a composition of 10% of hydrogenated tallow to 90% of partially hydrogenated palm kernel oil. In this low temperature region, the composition 40 to 60% shows a Solid Fat Index decrease of only 0.27 per degree. In the region between 92 and 100° F. the composition 10 to 90% shows a decrease of only 0.78 per degree of temperature rise but the composition 40 to 60% shows a decrease of 2.4 per each degree of temperature rise. Thus, it is obvious by a mere glance to the plot, that the composition containing a greater amount of hydrogenated tallow retains its solid character essentially up to 80° F. and then melts sharply.

The data for the Solid Fat Index at different proportions of soybean flakes with partially hydrogenated coconut oil are given in Table 3 below and are plotted in Figure 3.

TABLE 3.—SOLID FAT INDEX OF COMPOSITIONS OF HYDROGENATED SOYBEAN OIL WITH PARTIALLY HYDROGENATED COCONUT OIL

| T°, F. | Percent Composition of Soybean flakes | | | |
|---|---|---|---|---|
| | 10 | 20 | 30 | 40 |
| 50 | 50.3 | 55.5 | 60.0 | 59.9 |
| 70 | 29.7 | 38.3 | 47.3 | 47.9 |
| 80 | 14.6 | 26.8 | 37.9 | 40.6 |
| 92 | 0.2 | 5.2 | 14.8 | 21.5 |
| 100 | 0.0 | 0.0 | 3.2 | 10.1 |
| 104 | 0.0 | 0.0 | 0.4 | 5.6 |

The results with tallow and coconut oil are shown in Table 4 below and are plotted in Figure 4:

TABLE 4.—SOLID FAT INDEX OF COMPOSITIONS OF HYDROGENATED TALLOW AND PARTIALLY HYDROGENATED COCONUT OIL

| T°, F. | Percent Composition of Hydrogenated Tallow | | | |
|---|---|---|---|---|
| | 10 | 20 | 30 | 40 |
| 50 | 53.4 | 57.0 | 59.2 | 64.7 |
| 70 | 32.9 | 39.9 | 46.1 | 53.6 |
| 80 | 16.5 | 27.8 | 36.5 | 46.1 |
| 92 | 0.0 | 5.0 | 13.4 | 27.6 |
| 100 | 0.0 | 0.0 | 1.7 | 16.5 |
| 104 | 0.0 | 0.0 | 0.0 | 11.4 |

Figure 5 gives the corresponding data for partially hydrogenated coconut oil and for palm kernel oil. It is obvious that these substances may not be used alone as hard butters because they melt low and do not have sufficient consistency in the region of 92° to 104° F.

The finding that the proportion of component A to B must be between 10 to 40% is strikingly shown by the data shown below in Table 5:

TABLE 5

| T., ° F. | 5% Hydrogenated Lard, 95% Partially Hydrogenated Coconut Oil | 60% Hydrogenated Lard, 40% Partially Hydrogenated Coconut Oil |
|---|---|---|
| 50 | 50.4 | 71.7 |
| 70 | 30.0 | 65.7 |
| 80 | 9.8 | 61.7 |
| 92 | 0.0 | 48.3 |
| 100 | 0.0 | 33.1 |
| 104 | 0.0 | 25.2 |

It is clear from the above data of Solid Fat Index that with fully hydrogenated lard and partially hydrogenated coconut oil, at a proportion 5% of the former and 95% of the latter, the material is all liquid at 92° F. On the other hand the composition 60% lard flakes to 40% coconut oil is still to a great extent not melted at 104° F. and would not be suitable as a hard butter because it would leave a "waxy feel."

Compositions were prepared in ratios of completely hydrogenated rapeseed oil to partially hydrogenated coconut and palm kernel oil, varying between 10 and 40%. The table below gives the values of the Solid Fat Index at different temperatures.

TABLE 6.—SOLID FAT INDEX OF COMPOSITIONS OF RAPE SEED FLAKES WITH PARTIALLY HYDROGENATED COCONUT OIL

| T., ° F. | Percent Composition of Rapeseed Flakes | | | |
|---|---|---|---|---|
| | 20 | 25 | 30 | 35 |
| 50 | 57.8 | 63.2 | 63.5 | 64.8 |
| 70 | 42.2 | 48.0 | 51.2 | 53.7 |
| 80 | 30.6 | 37.3 | 42.5 | 45.8 |
| 92 | 8.9 | 15.2 | 22.5 | 27.0 |
| 100 | 1.3 | 4.5 | 9.0 | 12.4 |
| 104 | 0.0 | 1.8 | 5.0 | 7.7 |

The solid Fat Index of compositions of rapeseed flakes and partially hydrogenated palm kernel oil are shown in Table 7.

TABLE 7.—SOLID FAT INDEX OF COMPOSITIONS OF RAPESEED FLAKES WITH PARTIALLY HYDROGENATED PALM KERNEL OIL

| T., ° F. | Percent Composition of Rapeseed Flakes | | | | |
|---|---|---|---|---|---|
| | 15 | 20 | 25 | 30 | 35 |
| 50 | 65.3 | 67.4 | 67.3 | 60.4 | 64.4 |
| 70 | 54.2 | 57.5 | 58.8 | 45.9 | 59.4 |
| 80 | 43.8 | 47.1 | 50.0 | 35.5 | 45.9 |
| 92 | 13.6 | 19.8 | 25.8 | 14.6 | 26.9 |
| 100 | 1.5 | 4.8 | 9.0 | 4.4 | 12.3 |
| 104 | 0.0 | 1.9 | 4.0 | 2.1 | 7.7 |

Experiments with marine oils have shown that they may be satisfactorily used as component A, after full hydrogenation, in combination with component B. The result with menhaden flakes, that is fully hydrogenated, together with palm kernel oil, partially hydrogenated, are shown in Table 8 below:

TABLE 8.—SOLID FAT INDEX OF COMPOSITIONS OF HYDROGENATED MENHADEN AND PARTIALLY HYDROGENATED PALM KERNEL OIL

| T., ° F. | Percent Composition of Menhaden Flakes | | | |
|---|---|---|---|---|
| | 10 | 20 | 30 | 40 |
| 50 | 63.4 | 62.3 | 65.2 | 68.0 |
| 70 | 53.9 | 49.7 | 55.4 | 60.1 |
| 80 | 39.4 | 37.2 | 45.2 | 53.3 |
| 92 | 9.6 | 10.6 | 21.3 | 32.1 |
| 100 | 0.0 | 0.0 | 3.8 | 13.5 |
| 104 | 0.0 | 0.0 | 0.2 | 7.2 |

Other compositions tested were: Cottonseed flakes either with palm kernel oil, of refractive index 25.5 or with coconut oil of refractive index 25, and sunflower flakes, peanut flakes, safflower flakes with coconut oil of refractive index 25. The results in the range 10 to 40% of component A to 90–60% of component B were satisfactory and the composition consisting of 40% of component A and 60% of component B showed a decrease in Solid Fat Index in the region between 92° and 100° F. between 1.3 and 2.4 per degree of temperature rise. In each instance the beta configuration was converted into the beta prime configuration.

The following example describes the preparation of hard butters from herring oil.

EXAMPLE 3

Two kilograms of herring oil were fully hydrogenated using 0.2% reduced nickel on kieselguhr at 30 p.s.i. of hydrogen and at a temperature of 200° C., and then flaked.

Two kilograms of palm kernel oil were hydrogenated until the refractive index was 25.5 to 25.7 at 60° C. Eight hundred grams of the incompletely hydrogenated palm kernel oil, were mixed with 200 grams of the flaked herring oil prepared as described above, and heated about one-half hour at 120° C. in an atmosphere of nitrogen to completely remove the moisture. The mixture contained 20% of component A and 80% of component B. Then a catalytic amount of sodium methoxide, about 0.2%, was added, and the mixture was kept at a temperature of 120° C. about one half hour. Interesterification occurred rapidly, as evidenced by the development of a red color. The content of the flask was cooled to 90° C., and water, in amount about 25% in excess over the amount of catalyst added, was used to destroy the catalyst. Solid by-products, "foots," that is soaps due to the hydrolysis of the fats, were separated from the oil by filtration. The resulting product was deodorized by high vacuum steam distillation.

Several compositions were similarly prepared in proportion between 10 and 40% of herring flakes and between 90 and 60% of partially hydrogenated palm kernel oil. The Solid Fat Index was determined for each composition at different temperatures, in the range between 50° and 104° F.

The different values obtained for several compositions comprising between 10 and 40% of component A, and between 90 and 60% of B with temperature rise from 50° to 104° F., are shown in Table 9 below:

TABLE 9.—SOLID FAT INDEX OF COMPOSITIONS OF HERRING FLAKES WITH PARTIALLY HYDROGENATED PALM KERNEL OIL

| T.,° F. | 10% | 20% | 30% | 40% |
|---|---|---|---|---|
| 50 | 61.0 | 62.5 | 64.1 | 66.2 |
| 70 | 45.6 | 50.0 | 53.3 | 57.1 |
| 80 | 29.4 | 37.2 | 44.0 | 49.3 |
| 92 | 1.4 | 8.1 | 16.0 | 28.2 |
| 100 | 0.0 | 0.0 | 2.1 | 10.8 |
| 104 | 0.0 | 0.0 | 0.2 | 5.6 |

The data above demonstrates that, in the range between 50° and 92° F., the Solid Fat Index of the compositions containing only 10% of herring flakes, decreases at the rate of about 1.4 units per degree, while the compositions show superior "stand up" quality, in the same temperature range, when the proportion of fully hydrogenated herring oil is 40%. With the higher proportion of herring flakes, 40%, the decrease of Solid Fat Index in the same temperature range is lower, only 0.9 units per degree Fahrenheit.

At a temperature of 100° F., the Solid Fat Index is zero when the proportion of hydrogenated herring oil is between 10 and 20%. When the proportion of fully hydrogenated herring oil is 30%, the Solid Fat Index at 100° F., is close to zero. With compositions containing 40% of herring oil, the Solid Fat Index is 10.8, at 100° F., thus making the composition in this range more suitable for hot weather coating. With compositions consisting of 40% hydrogenated herring oil, and 60% partially hydrogenated palm kernel oil, the decrease in Solid Fat Index in the temperature range between 92° and 100° F., is 2.1.

The experimental data above amply demonstrates that the hard butters, prepared in accordance with this invention, show remarkable "stand-up" qualities up to 92° F. In the region between 92° and 100° F., the compositions consisting of 40% of component A and 60% of component B, show sharp decrease in Solid Fat Index, between 1.3 and 2.4 per degree of temperature rise.

Excellent results were obtained by incorporating the hard butters prepared in accordance with this invention into chocolate-type coatings, icings, and confectioners coatings. The ranges of typical coating formulations used in chocolate-type coatings are shown below in Table 10, where the figures are expressed in percent.

TABLE 10.—CHOCOLATE COATING FORMULATIONS

| | Dark Compound | Light Compound |
|---|---|---|
| Hard Butter | 31-32 | 31-32 |
| Cocoa | 18-17 | 8-9 |
| Skim Milk Powder | 6-8 | 6-8 |
| Sugar (4x or slightly coarser in grind) | 43-45 | 52-54 |
| Salt | 0.20 | 0.2-0.3 |
| Vanillin | 0.10 | 0.10 |
| Lecithin | 0.35 | 0.35 |

All the compositions prepared according to the teachings of this invention, that is, prepared from a component A which was of animal or vegetable, or marine origin, could be used as the hard butter in the formulation above.

All the ingredients were measured and combined with the exception of about one-half of lecithin and a small portion, about 2 to 4% of the hard butter. After blending, the temperature of the mix was 120° to 145° F.

The blend was refined to reduce the particle size to a range between 25 and 40 microns. The coating was placed in storage tanks, at temperature of 135° to 145° F. for about 24 hours, during which time it was stirred in order to lower the viscosity and reach a constant velocity value. The residual portions of 2 to 4% hard butter and lecithin were then added for the purpose of further lowering the viscosity. The coating was then tempered and molded into blocks, or kept in the melted state. It could be shipped either in the solid or melted form and it was stable over a period of at least one year. Coatings prepared from the stored material were not inferior to coatings prepared immediately.

*White coating*

A white coating was prepared by blending 33 lbs. of a hard butter prepared in accordance with the invention, 18 lbs. of milk solid powder, 49 lbs. of fine sugar, 3 oz. of salt, ½ lb. of vanilla and 2.5 oz. of lecithin. The product was very satisfactory in stability, taste and was free from the waxy mouth feel.

In the chocolate coating formulations, shown above in Table 10, cocoa is the chocolate ingredient, and chocolate liquor may be used only in a very small proportion. If, however, the hard butters prepared from marine oils, or from the oils of the Cruciferae family, that is rapeseed oil, ravison and mustardseed, as described in this application, are used in the same formulations, chocolate liquor may be incorporated into the compositions, with great improvement in flavor, and no blooming occurs.

The results with two chocolate coating compositions, composition 1 from commercial hard butters, and composition 2 from a hard butter prepared in accordance with this instant invention, from herring flakes or fully hydrogenated rapeseed oil, and partially hydrogenated palm kernel oil, in the ratio of 30 to 70, are shown below, in Table 11.

TABLE 11

| Ingredients | Amount of Ingredient, Percent | Results with Composition 1 | Results with Composition 2 |
|---|---|---|---|
| Hard butter | 30 | Dull; blooming began after 2 weeks' storage. | Very good shine. No blooming after six months' storage. |
| Cocoa | 15-18 | | |
| Chocolate liquor | 5 | | |
| Sugar | 38-40 | | |
| Skim milk solid | 5-6 | | |
| Vanillin | 0.08-0.1 | | |
| Salt | 0.15-0.2 | | |
| Lecithin | 0.3-0.4 | | |

The data above demonstrates that chocolate liquor may be used in combination with the hard butters prepared from rapeseed oil or herring oil, but it may not be incorporated into coating compositions containing the commercial hard butters, not even in the amount of 5%. Composition 2, above, showed excellent shine and stability even after 6 months' storage.

Several variations of the formulation shown in Table 11 above, may be made, increasing progressively the amount of chocolate liquor and decreasing the amount of cocoa. Obviously, with increasing concentration of chocolate liquor, it becomes necessary to decrease the overall amount of hard butter, because of the high cocoa butter content of chocolate liquor. The stability and gloss are very satisfactory in each instance, even when the percentage of the hard butters prepared from the marine oils or rapeseed oil, in accordance with this instant invention, is increased to 45%.

When the proportion of chocolate liquor is increased to 10%, the amount of hard butter prepared from 30% herring flakes or rapeseed oil and 70% partially hydrogenated palm kernel oil is decreased to 29% and the amount of cocoa is also decreased to 14%. The other ingredients in the formulation, sugar, skim milk, vanillin, salt, lecithin are kept essentially constant, that is, between 5 and 6% of milk solid, between 38 and 40% of sugar, between 0.3 and 0.4% of lecithin, up to 1% of vanillin and between 0.1 and 0.2% of salt. The coating composition containing 10% chocolate liquor, is stable after six months' storage, exhibits excellent shine, and is free from blooming.

When the chocolate liquor is increased to 15%, the hard butter prepared from 30% herring flakes or hydrogenated rapeseed oil and 70% partially hydrogenated palm kernel oil is decreased to 28%, the cocoa is decreased to 11%, maintaining the other ingredients essentially constant, that is between 5 and 6% of milk solid, between 37 and 38% of sugar, between 0.08 and 0.1% of vanillin, between 0.1 and 0.2% of salt, and lecithin, in amount between 0.3 and 0.4%. After four months' storage, the composition exhibits excellent shine and is free from blooming. With still increasing proportion of chocolate liquor, that is 20%, the amount of hard butter prepared from 30% herring flakes or hydrogenated rapeseed oil and 70% partially hydrogenated palm kernel oil, is decreased to 25%, the cocoa is decreased to 8%, the other ingredients being kept essentially constant, that is, sugar at 37–38%, milk solid between 5 and 6%, vanillin in amount up to 0.1%, salt in amount between 0.1 and 0.2%, and lecithin between 0.3 and 0.4%.

With increasing proportion of chocolate liquor, namely 25%, the amount of cocoa is decreased to 7%, and the amount of the hard butter prepared from 30% herring flakes or hydrogenated rapeseed oil and 70% partially hydrogenated palm kernel oil, is decreased to 20%. The other ingredients are kept essentially constant, that is, the amount of sugar is between 37 and 38%, milk solid between 5 and 6%, the amount of vanillin is between 0.08 and 0.1% and the salt between 0.1 and 0.2%. After four months' storage, the coating composition exhibits very good shine and is free from blooming.

When the chocolate liquor is increased to 35%, the amount of the hard butter of the invention, containing 30% herring flakes or hydrogenated rapeseed oil and 70% partially hydrogenated palm kernel oil, is decreased to 14%, and the amount of cocoa is only 1–2%. The proportion of sugar is still between 37 and 38%, milk solid between 5 and 6%, vanillin between 0.08 and 0.1%, salt between 0.1 and 0.2%, and lecithin between 0.3 and 0.4%. This coating composition is stable and free from blooming for a period of at least two months.

With 45% chocolate liquor, the cocoa is totally eliminated and the proportion of the hard butter of the invention, prepared from 30% herring flakes or hydrogenated rapeseed oil and 70% partially hydrogenated palm kernel oil, is decreased to 10%. The other ingredients are essentially the same as in the composition above. This composition is stable for about a month, and blooming does not occur until after a one-month period has elapsed. Thus this composition, containing 45% chocolate liquor, with no cocoa, may be safely used, if a long storage period, not exceeding one month, is not contemplated.

Other compositions may be similarly prepared from hard butters containing more or less herring flakes or hydrogenated rapeseed oil depending on the location, the season and the temperature at which the food products must be stored. Similarly the hard butters from the other marine oils, and rapeseed oil, ravison and mustardseed, in accordance with the instant invention, may be incorporated, together with chocolate liquor, into light compound coatings, where the percentage of cocoa is ordinarily in the range of 8 to 9%, skim milk powder in the range between 6 and 8%, and sugar between 52 and 54%, as indicated in Table 10. The partial or total replacement of cocoa with chocolate liquor is just as satisfactory, in accordance with this instant invention, in the case of light compound coatings as with dark compound coatings.

The coating compositions prepared in accordance with this invention, may be used for a variety of products such as icings of cakes and cookies, coatings of ice cream bars and candies. The finished food products are superior to other conventional preparations, because of their richer flavor and superior gloss.

From the foregoing, it is apparent that this instant invention constitutes a substantial advance in the food industry, because it permits the preparation of hard butters from inexpensive sources, such as lard, tallow, marine oils, rapeseed oil, ravison and mustardseed. The hard butters prepared in accordance with the process described in this application, may be selected with the specific melting range suitable for each product of the confectionery industry. Further, hard butters are made available by the process described herein, which are compatible with chocolate liquor, thus improving the flavor and palatability of the finished food products. Those skilled in the art will readily visualize that variations of the specific examples described herein, are possible, without departing from the scope of the invention, which is to be limited only by the scope of the appended claims.

What is claimed is:

1. The process for the preparation of hard butter compositions which exhibit in the region between 80° and 104° F. a decrease in Solid Fat Index between 0.6 and 2.07 unit per each degree of temperature rise, which comprises:
   (a) hydrogenating a fat which is a member selected from the group consisting of cottonseed, lard, peanut, tallow, soybean, sesame, sunflower, palm oil, safflower, corn oil, rapeseed oil, ravison, mustardseed, herring oil, menhaden oil, whale oil and sardine oil, and combinations thereof until the iodine number is not higher than 5,
   (b) hydrogenating to half the initial iodine value a lauric acid-containing oil which is a member selected from the group consisting of palm kernel, coconut oil and babassu oil and combinations thereof,
   (c) mixing between 10 and 40% of the product from step (a) with 90 to 60% of the product from step (b),
   (d) subjecting said mixture to interesterification in the presence of an interesterification catalyst, at a temperature lower than 150° C. in sufficient amount to cause complete interesterification, and thereafter inactivating said catalyst,
   (e) purifying said interesterified product from the reaction mixture until said hard butter is free from odors.

2. The process of preparing hard butters which exhibit in the region between 92° and 100° F. a decrease in Solid Fat Index between 1.3 and 2.4 units per degree of temperature rise, which comprises
   (a) substantially completely hydrogenating a fat which is a member selected from the group of lard, tallow, soybean oil, cottonseed oil, peanut oil, sesame oil, sunflower oil, palm oil, safflower oil, corn oil, rapeseed oil, ravison, mustardseed, herring oil, manhaden oil, whale oil, sardine oil, and mixtures thereof,
   (b) hydrogenating a member of the group of coconut, babassu oil, palm kernel oil and mixtures thereof to approximately half the initial iodine value,
   (c) mixing 40 parts of said product from step (a) with 60 parts of said product from step (b),
   (d) and interesterifying said mixture.

3. The process according to claim 2 wherein said fat in step (a) is lard, said oil in step (b) is coconut oil, and the resulting compositions exhibit in the region between 92° and 100° F. a decrease of 1.8 units in Solid Fat Index per degree of temperature rise.

4. The process according to claim 2 wherein said fat in step (a) is tallow, said oil in step (b) is palm kernel oil and the resulting compositions exhibit in the region between 92° and 100° F. a decrease of 2.4 units in Solid Fat Index per each degree of temperature rise.

5. The method of preparation of hard butters compatible with chocolate liquor, which comprises the steps of:
(a) substantially completely hydrogenating an oil which is a member selected from the group consisting of rapeseed oil, ravson, mustardseed, herring oil, menhaden oil, whale oil, sardine oil, and mixtures thereof, until the iodine value is not higher than 5,
(b) hydrogenating to approximately half the initial iodine value a lauric acid-containing oil, which is a member selected from the group consisting of coconut oil, palm kernel oil and babassu oil and mixtures thereof,
(c) blending between 10 and 40% of the product from step (a) with between 90 and 60% of the product from step (b),
(d) subjecting said blend to interesterification,
(e) deodorizing said interesterified product from the reaction mixture until said hard butter is free from odors.

6. The method of making white coatings of improved body, free from waxy taste which comprises interesterifying a blend of 10 to 40% of a substantially completely hydrogenated fat which is a member selected from the group consisting of lard, tallow, cottonseed, peanut, soybean, sesame, sunflower, palm oil, safflower, corn oil, rapeseed oil, ravson, mustardseed, herring oil, menhaden oil, whale oil, sardine oil, and combinations thereof, with between 60 and 90% of a half-hydrogenated oil which is a member selected from the group consisting of palm kernel, babassu and coconut and combinations thereof, to form a hard butter, mixing 33 pounds of said hard butter with 49 lbs. of sugar, 18 lbs. of milk powder, 3 ounces of salt, one-half pound of vanilla, and 2.5 ounces of lecithin.

7. The method of preparing dark compound chocolate coatings which comprises interesterifying a blend of between 10 and 40% of a member selected from the group of substantially completely hydrogenated lard, tallow, cottonseed, peanut, soybean, sesame, sunflower, palm oil, safflower, corn oil, rapeseed oil, ravson, mustardseed, herring oil, menhaden oil, whale oil, sardine oil, and combinations thereof, with a member selected from the group consisting of half-hydrogenated palm kernel oil, coconut oil and combinations thereof to form a hard butter, mixing between 31 and 32% of said hard butter with between 43 and 45% of a sweetening agent, 6 to 8% of milk solid, between 17 and 18% of cocoa, 0.1% of vanillin, 0.4% of lecithin, and 0.2% parts of salt.

8. Hard butter compositions which are the product of interesterification of a blend of substantially completely hydrogenated herring oil, in the proportion between 10 and 40% and a member selected from the group consisting of palm kernel oil and coconut oil which has been hydrogenated to about one-half of the unsaturation originally present, in the proportion of 90 to 60%.

9. Hard butter compositions which are the product of interesterification of a blend of substantially completely hydrogenated rapeseed oil, in the proportion between 10 and 40% and a member selected from the group consisting of palm kernel oil and coconut oil which has been hydrogenated to about one-half of the unsaturation originally present, in the proportion of 90 to 60%.

10. A chocolate coating composition comprising between 18% and 1% of cocoa, between 5 and 35% of chocolate liquor, between 37 and 40% of sugar, between 5 and 6% of milk solids, between 0.08 and 0.1% of vanillin, between 0.1 and 0.2% of salt, between 0.3 and 0.4% of lecithin, and between 30 and 14% of a hard butter which is the product of interesterification of a blend consisting of 30% of a member selected from the group consisting of hydrogenated herring oil and rapeseed oil, with palm kernel oil which has been hydrogenated until the iodine value is 12.

11. A chocolate coating composition comprising 45% of chocolate liquor, 38% of sugar, between 5 and 6% of milk solids, vanillin in amount of between 0.08 and 0.1% salt between 0.1 and 0.2%, lecithin in amount between 0.3 and 0.4%, and 10% of a hard butter which is the product of interesterification of a blend of 30% of a member selected from the group consisting of hydrogenated herring oil and rapeseed oil, with 70% palm kernel oil which has been hydrogenated until the iodine value is 12.

No references cited.

MAURICE W. GREENSTEIN, *Primary Examiner.*